United States Patent [19]
Yu

[11] Patent Number: 6,128,437
[45] Date of Patent: Oct. 3, 2000

[54] DIGITAL CONTROL FOR REVOLVING SPEED OF DC MOTOR

[75] Inventor: Shou-Te Yu, Taoyuan Shien, Taiwan

[73] Assignee: Delta Electronics, Inc., Taiwan

[21] Appl. No.: 08/988,051

[22] Filed: Dec. 10, 1997

[51] Int. Cl.$^7$ .................................................. H02P 7/285
[52] U.S. Cl. ............................................ 388/828; 388/815
[58] Field of Search ...................................... 388/800–815, 388/825–827, 828–829; 318/461, 466

[56] References Cited

U.S. PATENT DOCUMENTS

| | | | |
|---|---|---|---|
| 4,449,082 | 5/1984 | Webster | 318/618 |
| 4,458,185 | 7/1984 | Matty et al. | 318/270 |
| 4,517,501 | 5/1985 | Takimoto | 318/445 |
| 5,831,405 | 11/1998 | Massie | 318/471 |

*Primary Examiner*—David Martin
*Attorney, Agent, or Firm*—Fay, Sharpe, Fagan, Minnich & McKee, LLP

[57] ABSTRACT

A digital control device used with a direct-current (DC) motor is disclosed. The digital control device controls the revolving speed of a DC motor by outputting a certain intensity of current according to the digital states of a group of digital signals inputted therein from the external such as a computer system. The digital control device performs a precise control for the revolving speed of the DC motor at low cost, and the speed levels of the DC motor can be varied with the circuitry details of the digital control device.

5 Claims, 4 Drawing Sheets

DIGITAL CONTROL FOR REVOLVING SPEED OF DC MOTOR

FIELD OF THE INVENTION

The present invention is related to a control device used with a direct-current (DC) motor, and more particularly to a device for controlling the revolving speed of a DC motor in a digital manner.

BACKGROUND OF THE INVENTION

Commercially available DC motors for example used in fans can be classified into three types of constant revolving speed, adjustable revolving speed with external voltage, and adjustable revolving speed with temperature. Generally speaking, different control means are adapted to different types of motors. If digital control means can be incorporated into the design of a DC motor to control its revolving speed, the precision of the speed control can be enhanced. On the other hand, it will be more preferred if a cost-effective digital control device is available for precisely controlling the revolving speed of a DC motor.

SUMMARY OF THE INVENTION

An object of the present invention is to provide a digital control device used with a DC motor, which performs a precise control for the revolving speed of the DC motor at low cost.

The present invention is related to a digital control device for controlling a revolving speed of a direct-current motor in response to a group of digital signals. The group of digital signals can be provided by an external device such as a computer system.

According to the present invention, the digital control device includes a digital control circuit for receiving the group of digital signals, and outputting a certain intensity of current according to a combination state of the group of digital signals; and a driving circuit electrically connected to the digital control circuit and the direct-current motor for controlling the revolving speed of the direct-current motor according to the certain intensity of current.

In a preferred embodiment, the digital control circuit includes a potential adjusting unit for receiving the group of digital signals, and outputting a certain value of potential and a switch signal according to the combination state of the group of digital signals; a voltage/current converting unit electrically connected to the potential adjusting unit for converting the certain value of potential into the certain intensity of current; and a switch unit electrically connected to the potential adjusting unit and the driving circuit for controlling the provision of the certain intensity of current for the driving circuit in response to the switch signal.

The potential adjusting unit preferably includes a resistor set electrically connected to a power source for outputting the certain value of potential; and a transistor set having first base electrodes for receiving the group of digital signals, and first collector electrodes electrically connected to the resistor set for outputting the switch signal. The transistor set includes a group of first transistors having a count equal to the group of digital signals for respectively receiving the group of digital signals.

More preferably, the potential adjusting unit further includes a group of inverters having a count equal to the group of first transistors, and each of the inverters is electrically connected to a respective one of the first transistors for intensifying a respective one of the digital signals to be inputted into the respective one of the first transistors.

The resistor set mentioned above for example may include a first resistor having a first terminal electrically connected to the power source; and a group of second resistors having a third terminal electrically connected to a second terminal of the first resistor and the voltage/current converting unit, and having a count equal to the group of first transistors, each of the second resistors having a fourth terminal electrically connected to a respective one of the first collector electrodes of the first transistors. By the way, the voltage/current converting unit can be an emitter follower.

On the other hand, the switch unit may include a group of diodes having a count equal to the group of first transistors, and each of which having a P-terminal electrically connected to a respective one of the first collector electrodes of the first transistors for receiving the switch signal; a third resistor having a fifth terminal electrically connected to N-terminals of the diodes; and a second transistor having a second base electrode electrically connected to a sixth terminal of the third resistor, and a second collector electrode electrically connected to the driving circuit for controlling the flow of the certain intensity of current.

In another preferred embodiment, the switch unit is omitted so that the motor cannot be stopped through the digital control of the revolving speed, but an additional kind of revolving speed can be provided.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
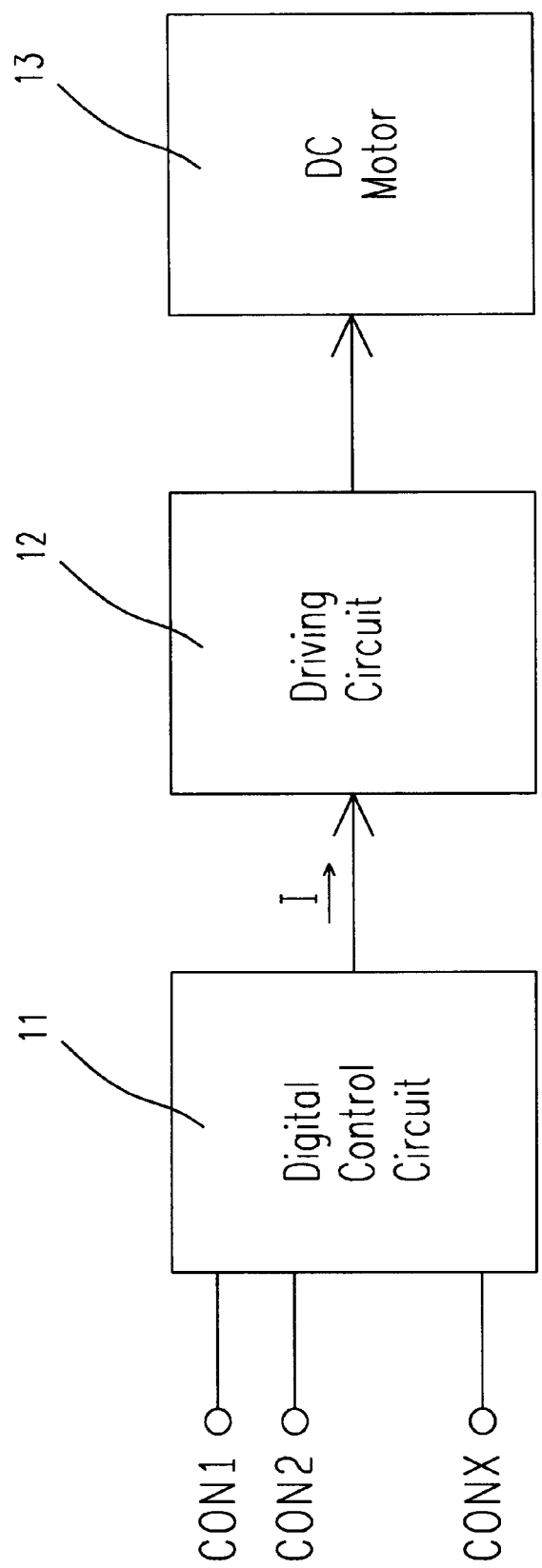
FIG. 1 is a schematic block diagram showing a digital control device according to the present invention.

Please refer to FIG. 1 which is a schematic block diagram showing a is digital control device according to the present invention. The digital control circuit for controlling a revolving speed of a direct-current (DC) motor 13 includes a digital control circuit 11 and a driving circuit 12. A group of digital signals CON1, CON2, . . . CONX are inputted from the external, e.g. a computer system, into the digital control circuit 11. The digital states of these signals are operated in the digital control circuit 11 so as to output a resulting current having a certain intensity. The certain intensity of current is provided for the driving circuit 12 to control the revolving speed of the direct-current (DC) motor 13 accordingly. For example, two kinds of revolving speed can be selected if one digital signal CON1 is provided for the digital control, i.e. the situations when the signal CON1 is in a high state and in a low state. Typically, a voltage of substantially 0 V indicates a low state, and a voltage of about 3.3 V, 5 V or 12 V indicates a high state, depending on the applications. For two-signal or two-bit control, four modes can be provided for varying the revolving speed of the DC motor 13, as listed in Table 1.

TABLE 1

| | digital states | | |
|---|---|---|---|
| | CON1 | CON2 | motor speed |
| $1^{st}$ mode | low | low | S1 |
| $2^{nd}$ mode | high | low | S2 |
| $3^{rd}$ mode | low | high | S3 |
| $4^{th}$ mode | high | high | S4 |

It can accordingly be derived that N digital signals can create $N^2$ kinds of revolving speed. On the other hand, by varying the circuitry of the digital control circuit 11, the speed values S1, S2, S3 and S4 may be different case by case.

Figure 2:
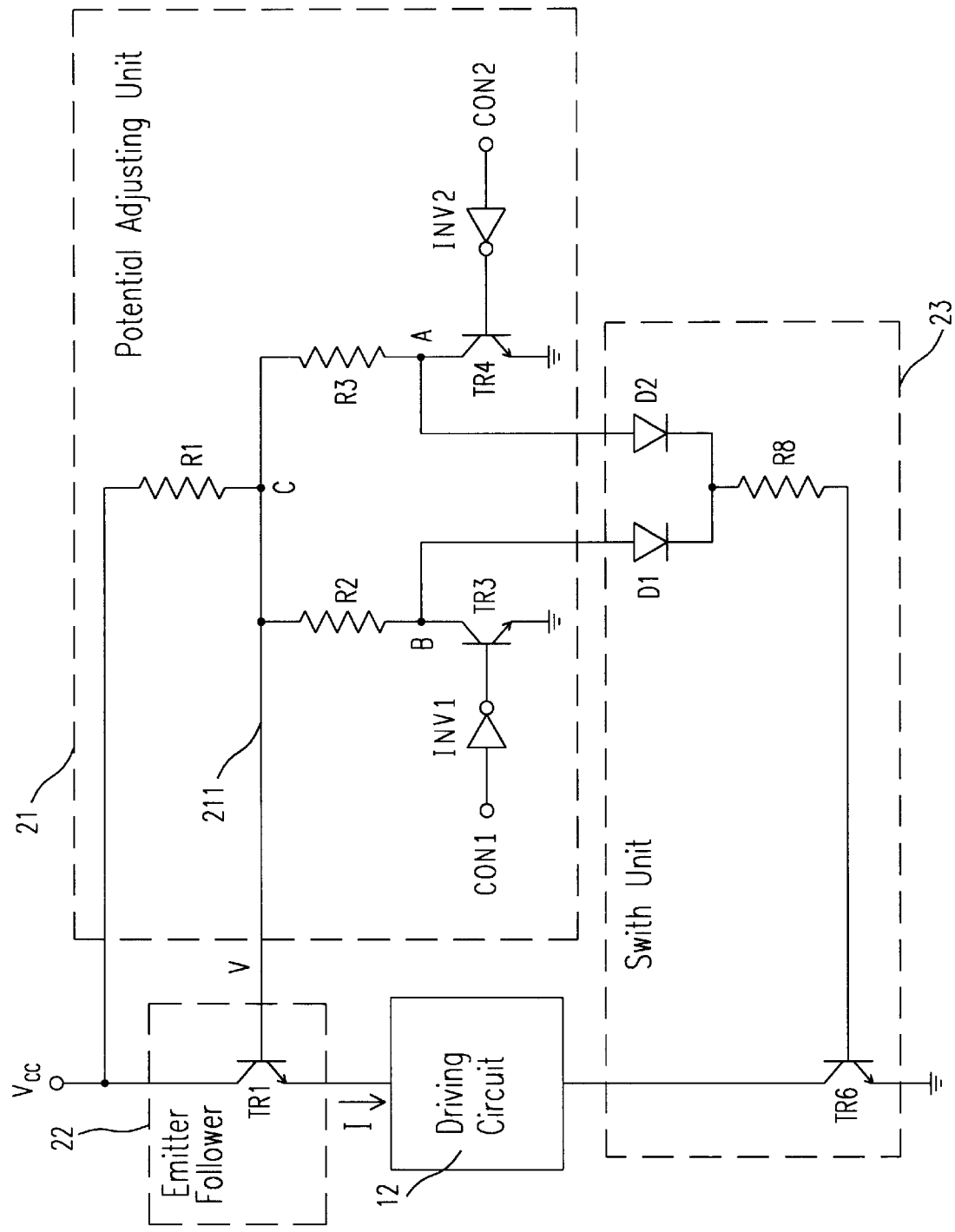
FIG. 2 is a schematic circuit diagram showing a first preferred embodiment of a digital control device according to the present invention.

Now, a preferred embodiment of the 2-bit circuitry of the digital control circuit 11 is shown in FIG. 2. The digital control circuit 11 includes a potential adjusting unit 21, a voltage/current converting unit 22, and a switch unit 23. The potential adjusting unit 21 includes resistors R1, R2 and R3, transistors TR3 and TR4, and inverters INV1 and INV2. The inverters INV1 and INV2 are connected to the base electrodes of the transistors TR3 and TR4, respectively, for intensifying the digital signals CON1 and CON2. The resistor R1 has a terminal connected to a power source Vcc, and another terminal connected with the resistors R2 and R3 and the voltage/current converting unit 22 at point C. The resistors R2 and R3 are further connected to the collector electrodes of the transistors TR3 and TR4 at points B and A, respectively. Through the signal line 211, a potential signal V having a value determined according to the states of the signals CON1 and CON2, the Vcc value, and the resistance values of the resistors R1, R2 and R3 is transmitted to the driving circuit 12.

The voltage/current converting unit 22 is an emitter follower in this preferred embodiment. After receiving the potential signal V, the voltage/current converting unit 22 converts the potential signal V into a current signal I which is to be provided for the driving circuit 12 to control the revolving speed of the DC motor.

The switch unit 23 includes two diodes D1 and D2 having their P-terminals connected to the collector electrodes of the transistors TR3 and TR4 at points B and A, respectively, a resistor R8 connected to the N-terminals of the diodes D1 and D2, and a transistor TR6 having its base electrode and collector electrode connected to the resistor R8 and the driving circuit 12, respectively. The switch unit 23 is used for determining the ON/OFF state of the motor by conducting/interrupting the circuit loop according to the states of the digital signals.

When the states of the signals CON1="0" and CON2="0" are indicated, the transistors TR3 and TR4 are turned on, the transistor TR6 is turned off, and the intensity value of the current signal I is substantially equal to zero. In other words, no current flows through the driving circuit so that the DC motor does no revolve, i.e. the revolving speed S1 is 0.

When the states of the signals CON1="0" and CON2="1" are indicated, the transistor TR3 is turned on, the transistor TR4 is turned off, and the potential value at the point C is equal to Vcc×R2/(R1+R2). Meanwhile, the potential value at the point A is almost equal to that at the point C so as to turn on the diode D2 and the transistor TR6. The potential signal V also turns the transistor TR1 of the emitter follower 22 on to allow the current signal I to flow through the driving circuit so as to control the revolving speed of the DC motor at a speed of S2.

When the states of the signals CON1="1" and CON2="0" are indicated, the transistor TR3 is turned off, the transistor TR4 is turned on, and the potential value at the point C is equal to Vcc×R3/(R1+R3). Meanwhile, the potential value at the point B is approximately equal to that at the point C so as to turn on the diode D1 and the transistor TR6. The potential signal V also turns the transistor TR1 of the emitter follower 22 on to allow the current signal I to flow through the driving circuit so as to control the revolving speed of the DC motor at a speed of S3. It is apparent that the speed values S2 and S3 can be different as long as the resistances of the resistors R2 and R3 are different.

When the states of the signals CON1="1" and CON2="1", the transistors TR3 and TR4 are both turned off, and the potential value at the point C is equal to Vcc. In other words, the potential value provided for the emitter follower 22 is Vcc which is greater than any of the potential values in the above cases, so that the revolving speed of the DC motor, i.e. S4, is the highest of the four modes.

By changing the Vcc value, and the resistance values of the resistors R1, R2 and R3, the revolving speed selections of the DC motor can have different combinations.

Figure 3:
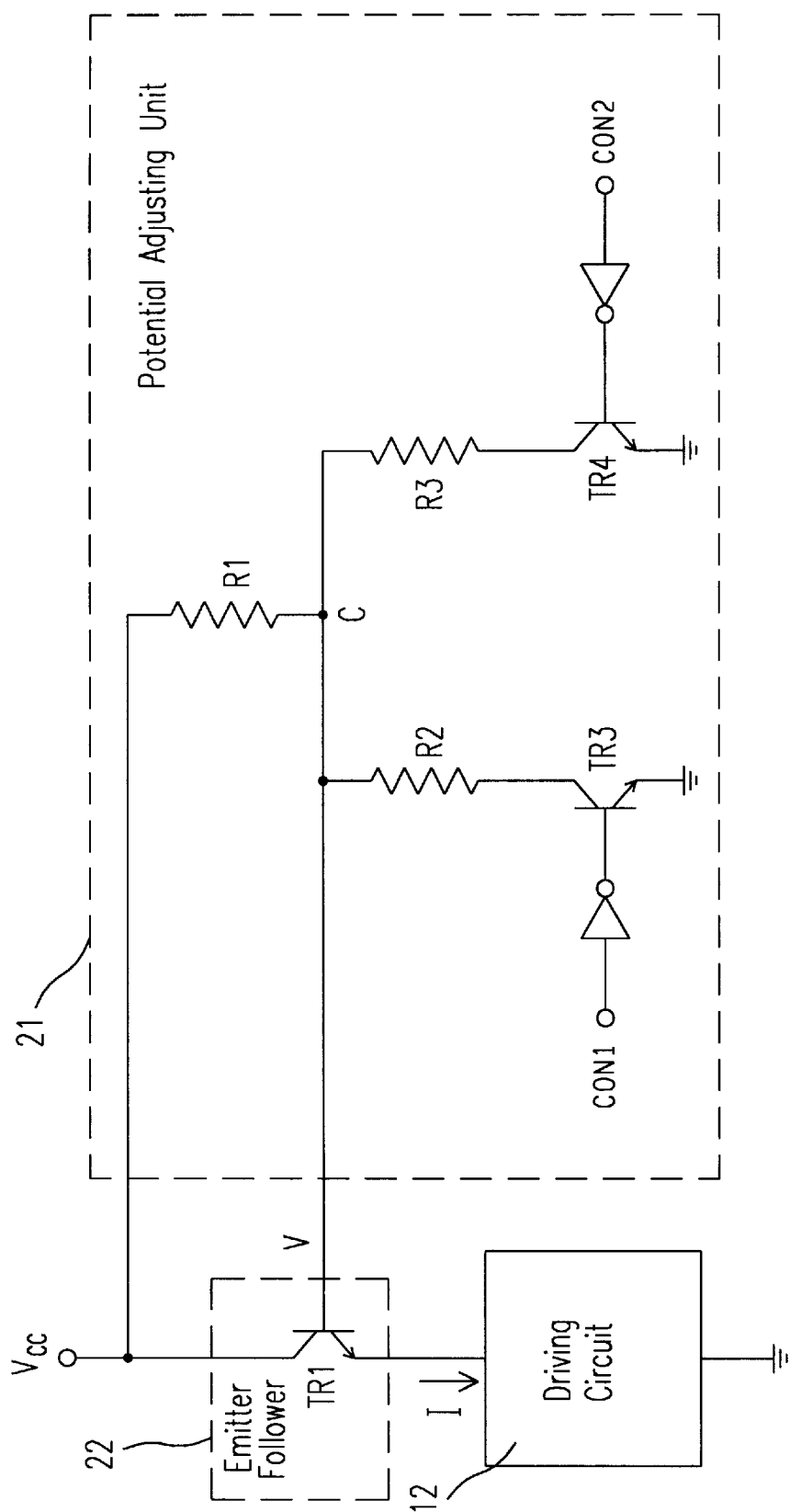
FIG. 3 is a schematic circuit diagram showing a second preferred embodiment of a digital control device according to the present invention.

Another preferred embodiment of the 2-bit circuitry of the digital control circuit 11 is shown in FIG. 3, in which the switch unit 23 is omitted, and the terminal of the driving circuit 12 connected to the transistor TR6 in the aforementioned embodiment is grounded. In this case, when the states of the signals CON1="0" and CON2="0" are indicated, the potential value at the point C is equal to Vcc×(R2//R3)/[R1+(R2//R3)], wherein R2//R3 equals to 1/(1/R2+1/R3), and represents a resistance value of the parallel connection of the resistors R2 and R3. In other words, a certain intensity of current converted from this potential value in the emitter follower 22 flows through the driving circuit 12 so as to control the revolving speed of the DC motor at a speed of S5 possibly different from the speed values S2, S3 and S4. It is different from the preferred embodiment shown in FIG. 2 where no current enters the driving circuit, i.e. S1=0, under the condition of CON1="0" and CON2="0".

Figure 4:
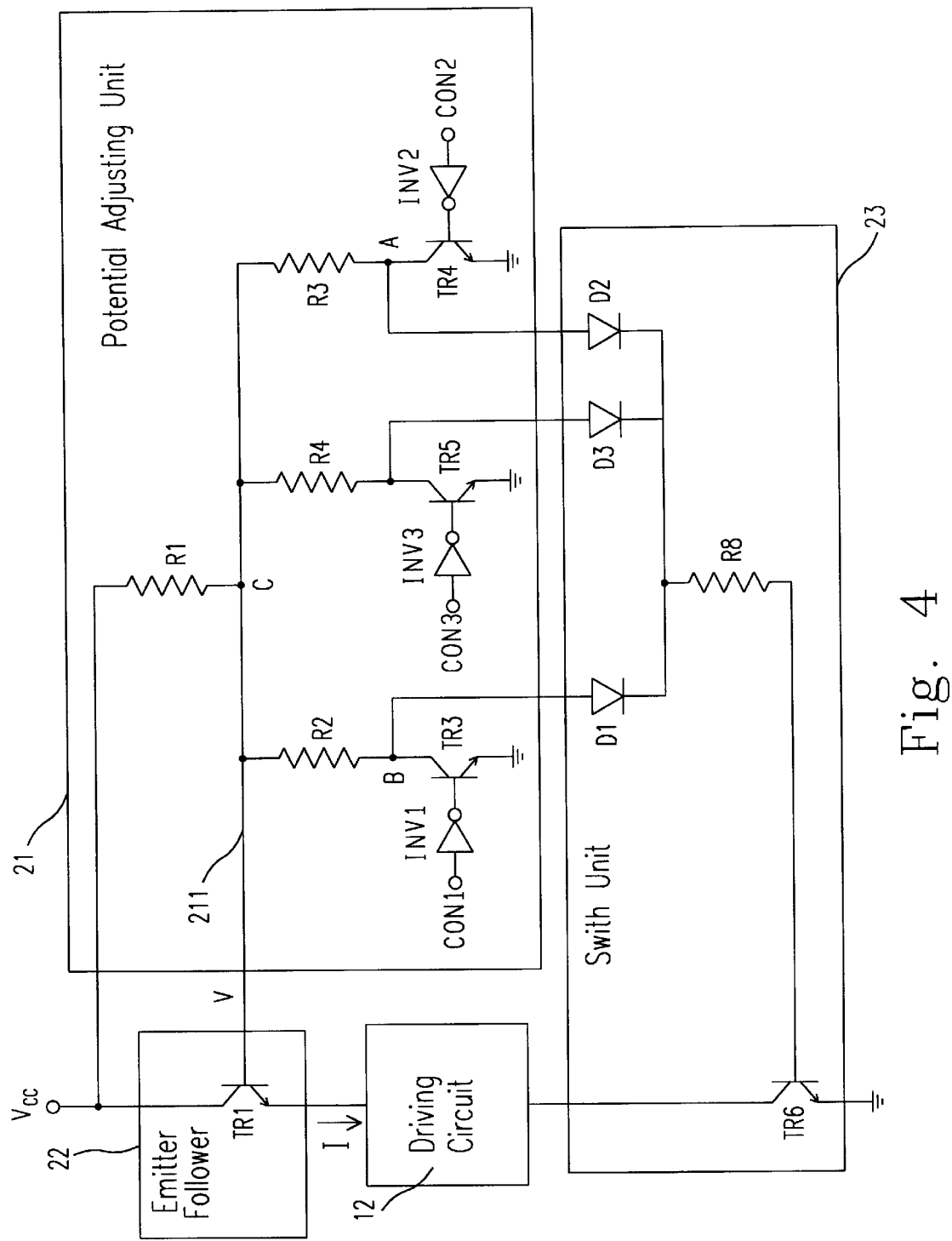
FIG. 4 is a schematic circuit diagram showing a third preferred embodiment of a digital control device according to the present invention.

The above two preferred embodiments are both illustrated by 2-bit control means. It can be derived for those skilled in the art from the above disclosure to construct a three or more bit control system. One of the examples is shown in FIG. 4. Additional resistor R4, transistor TR5, inverter INV3 and diode D3 are incorporated into the digital control device of FIG. 2 for further processing the digital signal CON3.

From the above description, it is concluded that the digital control for the revolving speed of a DC motor can be achieved by using transistors in the digital control circuitry. In addition, the revolving speed variations can be controlled by selecting a specific combination of the resistors used in the digital control circuitry. Moreover, while the presence of the switch unit allows the motor to be stopped by digital control, the absence of the switch unit allows a further different revolving speed to be selected.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A digital control device for controlling a rotating speed of a direct-current motor in response to a group of digital signals, comprising:

a digital control circuit for receiving said group of digital signals and generating a current signal having an intensity based on a combination state of said group of digital signals, the digital control circuit including:

a potential adjusting unit for receiving said group of digital signals and outputting a potential signal having an intensity based on said combination state of said group of digital signals and outputting a switch signal according to said combination state of said group of digital signals, the potential adjusting unit including a resistor set electrically connected to an associated power source for outputting said potential signal, and a group of first transistors equal in number to said group of digital signals with first base electrodes for respectively receiving said group of digital signals and first collector electrodes electrically connected to said resistor set for outputting said switch signal;

a voltage/current converting unit electrically connected to said potential adjusting unit for converting said potential signal into said current signal; and, a switch unit electrically connected to said potential adjusting unit for selectively controlling the provision of said current signal from said digital control circuit in response to said switch signal; and, a driving circuit electrically connected to said digital control circuit and to said direct-current motor for controlling said rotating speed of said direct-current motor according to said intensity of said current signal, said potential adjusting unit further including a group of inverters equal in number to said group of first transistors, each of said inverters being electrically connected to a respective one of said first transistors for intensifying a respective one of said digital signals to be inputted into said respective one of said first transistors.

2. A digital control device for controlling a rotating speed of a direct-current motor in response to a group of digital signals, comprising:

a digital control circuit for receiving said group of digital signals and generating a current signal having an intensity based on a combination state of said group of digital signals, the digital control circuit including:

a potential adjusting unit for receiving said group of digital signals and outputting a potential signal having an intensity based on said combination state of said group of digital signals and outputting a switch signal according to said combination state of said group of digital signals, the potential adjusting unit including a resistor set electrically connected to an associated power source for outputting said potential signal, and a group of first transistors equal in number to said group of digital signals with first base electrodes for respectively receiving said group of digital signals and first collector electrodes electrically connected to said resistor set for outputting said switch signal:

a voltage/current converting unit electrically connected to said potential adjusting unit for converting said potential signal into said current signal; and, a switch unit electrically connected to said potential adjusting unit for selectively controlling the provision of said current signal from said digital control circuit in response to said switch signal; and, a driving circuit electrically connected to said digital control circuit and to said direct-current motor for controlling said rotating speed of said direct-current motor according to said intensity of said current signal, said resistor set further including a first resistor having a first terminal electrically connected to said associated power source and a group of second resistors having a third terminal electrically connected to a second terminal of said first resistor and said voltage/current converting unit, and being equal in number to said group of first transistors, each of said second resistors having a fourth terminal electrically connected to a respective one of said first collector electrodes of said first transistors.

3. A digital control device for controlling a rotating speed of a direct-current motor in response to a group of digital signals, comprising:

a digital control circuit for receiving said group of digital signals and generating a current signal having an intensity based on a combination state of said group of digital signals, the digital control circuit including:

a potential adjusting unit for receiving said group of digital signals and outputting a potential signal having an intensity based on said combination state of said group of digital signals and outputting a switch signal according to said combination state of said group of digital signals, the potential adjusting unit including a resistor set electrically connected to an associated power source for outputting said potential signal, and a group of first transistors equal in number to said group of digital signals with first base electrodes for respectively receiving said group of digital signals and first collector electrodes electrically connected to said resistor set for outputting said switch signal;

a voltage/current converting unit electrically connected to said potential adjusting unit for converting said potential signal into said current signal; and, a switch unit electrically connected to said potential adjusting unit for selectively controlling the provision of said current signal from said digital control circuit in response to said switch signal; and, a driving circuit electrically connected to said digital control circuit and to said direct-current motor for controlling said rotating speed of said direct-current motor according to said intensity of said current signal, said switch unit further including: a group of diodes equal in number to said group of first transistors, each of the group of diodes having a P-terminal electrically connected to a respective one of said first collector electrodes of said first transistors for receiving said switch signal; a third resistor having a fifth terminal electrically connected to N-terminals of said diodes; and, a second transistor having a second base electrode electrically connected to a sixth terminal of said third resistor, and a second collector electrode electrically connected to said driving circuit for controlling the flow of said current signal.

4. A digital control device for controlling a rotating speed of a direct-current motor in response to a group of digital signals, comprising:

a digital control circuit for receiving said group of digital signals and generating a current signal having an intensity based on a combination state of said group of digital signals, the digital control circuit including:

a potential adjusting unit for receiving said group of digital signals and outputting a potential signal having an intensity based on said combination state of said group of digital signals and outputting a switch signal according to said combination state of said group of digital signals, the potential adjusting unit including a resistor set electrically connected to an associated power source for outputting said potential signal, and a group of first transistors equal in number to said group of digital signals with first base electrodes for respectively receiving said group of digital signals and first collector electrodes electrically connected to said resistor set for outputting said switch signal; and, a voltage/current converting unit electrically connected to said potential adjusting unit for converting said potential signal into said current signal;

a driving circuit electrically connected to said digital control circuit and to said direct-current motor for controlling said rotating speed of said direct-current motor according to said intensity of said current signal, said potential adjusting unit further including a group of inverters equal in number to said group of first transistors, each of said inverters being electrically connected to a respective one of said first transistors for intensifying a respective one of said digital signals to be inputted into said respective one of said first transistors.

5. A digital control device for controlling a rotating speed of a direct-current motor in response to a group of digital signals, comprising:

a digital control circuit for receiving said group of digital signals and generating a current signal having an intensity based on a combination state of said group of digital signals, the digital control circuit including:

a potential adjusting unit for receiving said group of digital signals and outputting a potential signal having an intensity based on said combination state of said group of digital signals and outputting a switch signal according to said combination state of said group of digital signals, the potential adjusting unit including a resistor set electrically connected to an associated power source for outputting said potential signal, and a group of first transistors equal in number to said group of digital signals with first base electrodes for respectively receiving said group of digital signals and first collector electrodes electrically connected to said resistor set for outputting said switch signal; and, a voltage/current converting unit electrically connected to said potential adjusting unit for converting said potential signal into said current signal;

a driving circuit electrically connected to said digital control circuit and to said direct-current motor for controlling said rotating speed of said direct-current motor according to said intensity of said current signal, said resistor set further including a first resistor having a first terminal electrically connected to said associated power source and a group of second resistors having a third terminal electrically connected to a second terminal of said first resistor and said voltage/current converting unit, and being equal in number to said group of first transistors, each of said second resistors having a fourth terminal electrically connected to a respective one of said first collector electrodes of said first transistors.

* * * * *